(12) United States Patent
Shimosaki et al.

(10) Patent No.: US 8,468,596 B2
(45) Date of Patent: Jun. 18, 2013

(54) WORK SUPPORT APPARATUS FOR INFORMATION PROCESSING DEVICE

(75) Inventors: Makoto Shimosaki, Kawasaki (JP); Seiji Endou, Kawasaki (JP); Taisuke Aizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 12/409,099

(22) Filed: Mar. 23, 2009

(65) Prior Publication Data
US 2009/0271449 A1 Oct. 29, 2009

(30) Foreign Application Priority Data

Apr. 25, 2008 (JP) ................. 2008-115713

(51) Int. Cl.
*G06F 12/14* (2006.01)
*G06F 11/00* (2006.01)
*G06F 15/16* (2006.01)
*G06F 17/30* (2006.01)

(52) U.S. Cl.
USPC ............ 726/22; 726/4; 726/5; 726/6; 726/26; 726/33

(58) Field of Classification Search
None
See application file for complete search history.

(56) References Cited

U.S. PATENT DOCUMENTS

| | | | | |
|---|---|---|---|---|
| 7,519,826 | B2 * | 4/2009 | Carley | 713/182 |
| 7,941,829 | B2 * | 5/2011 | Carley | 726/4 |
| 2002/0162005 | A1 * | 10/2002 | Ueda et al. | 713/182 |
| 2006/0080656 | A1 * | 4/2006 | Cain et al. | 717/174 |
| 2006/0271781 | A1 * | 11/2006 | Murakawa | 713/168 |
| 2007/0136603 | A1 * | 6/2007 | Kuecuekyan | 713/185 |
| 2008/0010665 | A1 * | 1/2008 | Hinton et al. | 726/1 |

FOREIGN PATENT DOCUMENTS
WO WO 01/82086 11/2001

* cited by examiner

*Primary Examiner* — Nathan Flynn
*Assistant Examiner* — Trang Doan
(74) *Attorney, Agent, or Firm* — Greer, Burns & Crain, Ltd.

(57) ABSTRACT

To provide a work support apparatus capable of allowing an operator to safely and easily perform work requiring all or a part of a privilege, and concisely confirming the contents of the work later, a work support apparatus 100 includes: an application processing unit 101 for accepting a work application; an approval processing unit 102 for performing an approving process; a work monitoring unit 103 for controlling and monitoring an operation from the operator terminal 111; an approval number collecting unit 104 for collecting information relating to an unnecessary approval number; an approval number management information storage unit 105 for storing approval number management information; and an operation log storage unit 106 for storing an operation log.

10 Claims, 7 Drawing Sheets

APPROVAL NUMBER MANAGEMENT INFORMATION

```
# APPROVAL NUMBER, WORK STARTING DATE AND TIME, WORK TERMINATION
# DATA   AND TIME, USER ACCOUNT, PRIVILEGE, APPROVAL/NON-APPROVAL FLAG
 20071130_001, 20071225150000, 20071225210000, dbmaanger, dbadmin, Y
 20071130_002, 20071225120000, 20071225210000, webmanager, webadmin, Y
 20071220_001, 20080101120000, 20080101180000, sysmanager, root, Y
 20071220_002, 20080101150000, 20080101200000, dbmanager, dbadmin,Y
 20071231_001, 20080120100000, 20080120180000, apmanager, apadmin,Y
 20071231_002, 20080101160000, 20080101220000, webmanager, webadmin, Y
```

APPROVAL NUMBER MANAGEMENT INFORMATION

APPROVAL_NUMBER, WORK STARTING DATE AND TIME, WORK TERMINATION
DATA AND TIME, USER ACCOUNT, PRIVILEGE, APPROVAL/NON-APPROVAL FLAG
20071130_001, 20071225150000, 20071225210000, dbmaanger, dbadmin, Y
20071130_002, 20071225120000, 20071225210000, webmanager, webadmin, Y
20071220_001, 20080101120000, 20080101180000, sysmanager, root, Y
20071220_002, 20080101150000, 20080101200000, dbmanager, dbadmin, Y
20071231_001, 20080120100000, 20080120180000, apmanager, apadmin, Y
20071231_002, 20080101160000, 20080101220000, webmanager, webadmin, Y
 . . .

EXAMPLE OF OPERATION LOG 20071220130000, secmanager, 20080101120000, 20080101180000, sysmanager, root, approve, 20071200_001
20071225153030, webmanager, /etc/opt/webapli/setting, read, 20071130_002
20071225164510, webmanager, /opt/webapli/bin/cmd, invoke, 20071130_002
20071225170000, dbmanager, /etc/opt/dbapli/setting, write, 20071130_001
20071225175000, webmanager, /etc/opt/webapli/setting, write, 20071130_002
20080101121530, sysmanager, begin, 20071200_001
20080101123000, sysmanager, /opt/apli/bin/cmd1, write, 20071220_001
20080101123110, sysmanager, /opt/apli/bin/cmd2, write, 20071220_001
20080101123330, sysmanager, /etc/opt/apli/setting, write, 20071220_001
20080101124510, sysmanager, /opt/apli/bin/cmd1, invoke, 20071220_001
20080101153030, webmanager, /etc/opt/webapli/setting, read, 20071231_002
20080101164510, webmanager, /opt/webapli/bin/cmd, invoke, 20071231_002
20080101170000, dbmanager, /etc/opt/dbapli/setting, write, 20071220_002
20080101173015, webmanager, /etc/opt/webapli/setting, write, 20071231_002
20080101173530, sysmanager, /etc/opt/apli/setting, write, 20071220_001
20080101174550, sysmanager, end, 20071200_001 b
c
d
c

F I G. 6

EXAMPLE OF LOG CONFIRMED BY ADMINISTRATOR
(EXAMPLE OF CONFIRMING WORK OF APPROVAL NUMBER 20071220_001)

20071220130000, secmanager, 20080101120000, 20080101180000, sysmanager, root, approve, 20071220_001
20080101121530, sysmanager, begin, 20071200_001
20080101123000, sysmanager, /opt/apli/bin/cmd1, write, 20071220_001
20080101123110, sysmanager, /opt/apli/bin/cmd2, write, 20071220_001
20080101123330, sysmanager, /etc/opt/apli/setting, write, 20071220_001
20080101124510, sysmanager, /opt/apli/bin/cmd1, invoke, 20071220_001
20080101173530, sysmanager, /etc/opt/apli/setting, write, 20071220_001
20080101174550, sysmanager, end, 20071200_001

F I G. 7

WORK SUPPORT APPARATUS FOR INFORMATION PROCESSING DEVICE

CROSS-REFERENCE TO RELATED APPLICATION

This application is based upon and claims the benefit of priority of the prior Japanese Patent Application No. 2008-115713, filed on Apr. 25, 2008, the entire contents of which are incorporated herein by reference.

FIELD

The present invention relates to a work support apparatus for supporting the work such as maintenance work etc. in an information processing device or an information processing system performed using all or a part of the authority of an administrator.

BACKGROUND

Conventionally, when maintenance work such as applying a security patch etc. is performed, an information processing system for performing a basic application etc. notifies an operator of a password for a privilege (for example, a user account of a user having a root authority in a Unix system), and performs the work under the privilege of the operator.

Relating to the above-mentioned technology, International Publication Pamphlet No. WO01/82086A1 discloses a system including: an access right setting device capable of setting the right of easily accessing a user whose access to network resources is limited at a request of the user; and an administrator terminal.

SUMMARY

To maintain a security level, it is necessary to manage a password by, for example, changing the password for each performance. Therefore, the load for maintenance and management including the management of passwords develops, thereby causing the possibility that a necessary process for maintaining the security level such as changing a password can be forgotten.

In addition, a system (for example, a sudo command in the Unix system) of allowing a registered user to perform at any time an operation under a privilege without inputting a password of the privilege has been conventionally provided by registering a user account and a group account in advance.

In this case, although it is not necessary to notifying an operator of the password of a privilege, it is necessary to return settings after work, thereby causing the possibility that a necessary process for maintaining the security level such as changing a password can be forgotten.

There is also a system of performing only an operation registered without inputting a password of a privilege by registering in advance an operation to be performed. However, there is the problem that it is practically difficult to extract an operation in advance and recover the operation when an unexpected abnormal condition occurs.

In addition, an administrator finds a corresponding work from a log output by an operating system and an application using a working time period as a key to confirm whether or not work of applying a security patch etc. has been appropriately performed, and actually confirms it. It is difficult to correctly extract only the log of a corresponding log from among logs including operations of a plurality of different users, and there is the possibility of lost or erroneous confirmation.

As described above, in the conventional information processing system, it is necessary to manage a user account, a password, etc. before and after the work of an administrator. Therefore, the working load of the administrator is heavy, thereby possibly causing a security hole by failing to perform work.

To confirm the operation performed by an operator, it is necessary to find out a corresponding operation using a working time period etc. as a key from among a plurality of logs including third party's. Therefore, confirming work becomes complicated, thereby possibly failing to recognize a history to be confirmed or mistaking the history.

To solve the above-mentioned problems, the work support apparatus supports work requiring a specific authority, and includes: an application processing unit for notifying an administrator terminal used by an administrator who determines approval/non-approval of an application upon receipt of a work condition including a privilege required to perform specific work from any operator terminal and the application for an approval to perform the work, and storing approval number management information including an approval number for the application and the work condition in an approval number management information storage unit; an approval processing unit for storing an operation log including at least the approval number included in the approval number management information about the application in response to the approval notification upon receipt of the approval notification of the application from the administrator terminal in an operation log storage unit, and notifying the operator terminal of a result of the approval notification; a work monitoring unit for reading the approval number management information about the application from the approval number management information storage unit upon receipt of a notification of a start of the applied work from the operator terminal, determining whether or not the application is approved and a work condition included in the approval number management information is satisfied, assigning the privilege to the operator terminal when it is determined that the application is approved and the work condition is satisfied, and storing in the operation log storage unit an operation log including at least the approval number, and nullifying the privilege assigned to the operator terminal when an end of the work is detected, and storing an operation log including at least the approval number in the operation log; and an operation log generation unit for generating an operation log including at least the approval number for the work when a work of the operator terminal assigned the privilege is detected, and storing the operation log in the operation log storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 shows an example of the approval number management information about an embodiment of the present invention;

FIG. 6 shows an example of an operation log according to an embodiment of the present invention; and FIG. 7 shows an example of an operation log confirmed by an administrator according to an embodiment of the present invention.

DESCRIPTION OF EMBODIMENTS

The embodiments of the present invention are described below with reference to FIGS. 1 through 7.

Figure 1:
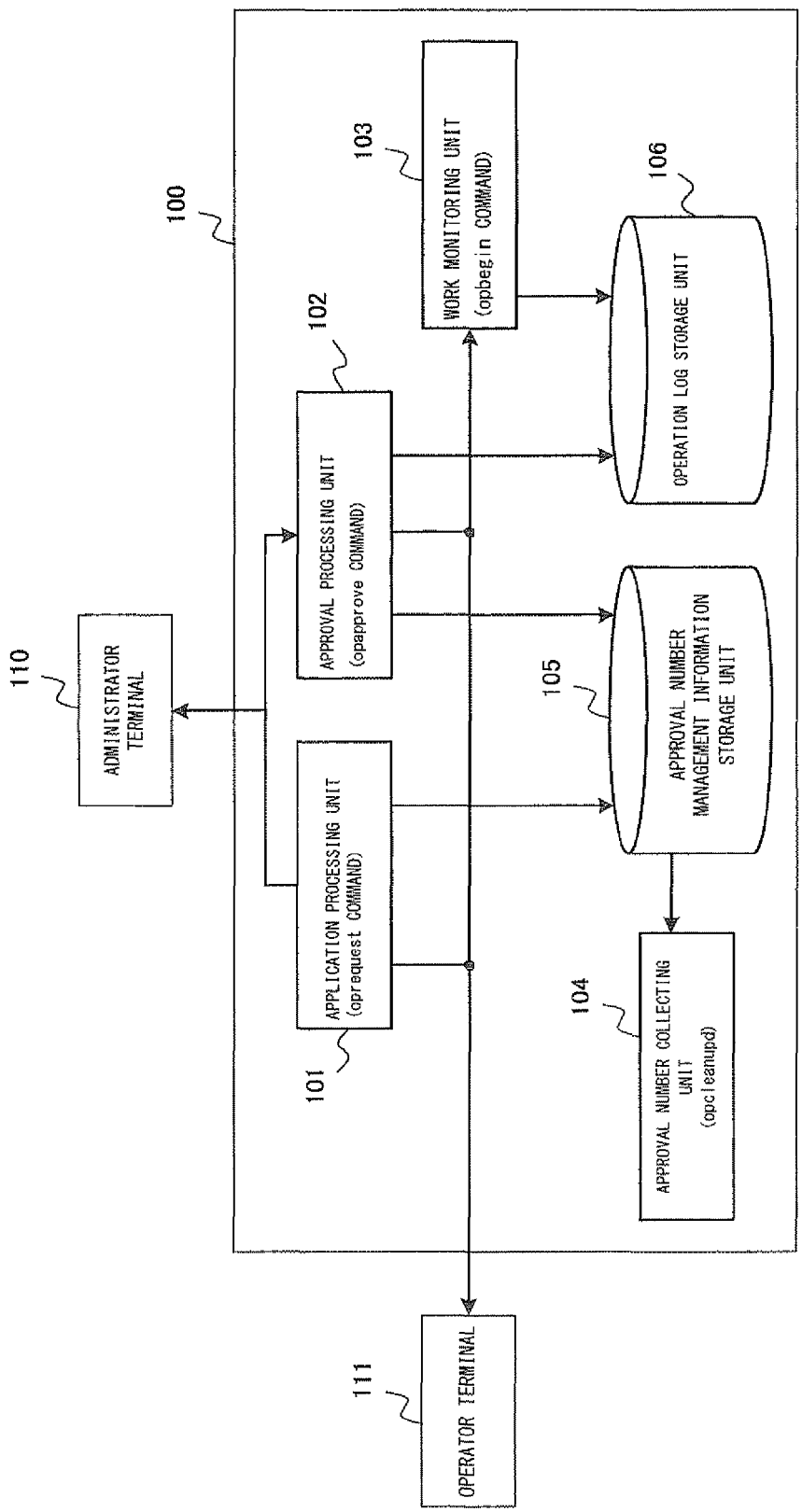
FIG. 1 is an explanatory view showing an example of the configuration of the work support apparatus according to an embodiment of the present invention.

FIG. 1 is an explanatory view showing an example of the conf of a work support apparatus 100 according to an embodiment of the present invention.

The work support apparatus 100 shown in FIG. 1 includes: an application processing unit 101 for accepting a work application from an operator terminal 111; an approval processing unit 102 for performing an approving process at an instruction from an administrator terminal 110, a work monitoring unit 103 for controlling and monitoring an operation from the operator terminal 111; an approval number collecting unit 104 for collecting the information about an unnecessary approval number; an approval number management information storage unit 105 for storing approval number management information including the approval number; and an operation log storage unit 106 for storing an operation log.

The administrator terminal 110, the operator terminal 111, and the work support apparatus 100 are connected via a network or a dedicated line etc. to communicate with one another. For example, an administrator logs in the work support apparatus 100 with a specific user account (hereinafter the user account in this case is referred to as a "administrator account") from the administrator terminal 110, and performs a work in a range recognized for the user account such as referring to an operation log etc. An operator logs in the work support apparatus 100 with a specific user account (hereinafter the user account in this case is referred to as an "operator account") from the operator terminal 111, and performs a work in a range recognized for the user account.

Upon receipt of a work application from the operator terminal 111, the application processing unit 101 simultaneously acquires a condition relating to the work (hereinafter referred to as a "work condition") transmitted from the operator terminal 111. A work condition refers to information including, for example, a privilege necessary for a work (an account having a root privilege in the case of a UNIX system etc.), a work starting date and time, a work termination date and time, a user account for use during work, etc.

The application processing unit 101 generates approval number management information by adding an approval number for the work application and an approval/non-approval flag for identifying the approval/non-approval for the work application to the work condition, and stores the information in the approval number management information storage unit 105. Simultaneously, the application processing unit 101 notifies the administrator terminal 110 of the work application, and notifies the administrator terminal 110 of a work condition transmitted from the operator terminal 111.

The approval processing unit 102 accepts an approval/non-approval notification of the work application from the administrator terminal 110. Upon receipt of an approval notification of the work application, the approval processing unit 102 sets the approval/non-approval flag about the approval number management information stored in the approval number management information storage unit 105 as "Y".

In addition, upon receipt of a non-approval notification of a work application, the approval processing unit 102 sets the approval/non-approval flag of the corresponding approval number management information stored in the approval number management information storage unit 105 ad "N" (when the initial value of the approval/non-approval flag is "N", the process is unnecessary). Otherwise, the approval number management information is deleted.

The approval processing unit 102 notifies the operator terminal 111 of approval/non-approval. When a work application is approved, an approval notification is also transmitted. The approval processing unit 102 stores in the operation log storage unit 106 the approval number management information together with the current date and time and the user account of the administrator using the approval number management information as an operation log.

Upon receipt of a work start notification, the work monitoring unit 103 acquires an approval number transmitted with the notification. Then, the work monitoring unit 103 acquires the corresponding approval number management information from the approval number management information storage unit 105.

Then, the work monitoring unit 103 determines whether or not the user account and the current date and time match the conditions recorded in the approval number management information. If it determines that they match the conditions, the work monitoring unit 103 changes the user account into the user account of the applied privilege.

Afterwards, the work monitoring unit 103 detects a work until the work with the privileged user account is completed, generates an operation log assigned an approval number each time the detection is performed, and outputs the log to the operation log storage unit 106. In the present embodiment, the work monitoring unit 103 generates the above-mentioned operation log, but it is obvious that the operation log can also be generated by providing an operation log processing unit.

To realize the process of generating the operation log, for example, the approval number is set in the process information managed by the operating system according to the work support apparatus 100. At this time, upon receipt of the work in a system call, the operating system generates an operation log assigned an approval number, and stores the log in the operation log storage unit 106.

The approval number collecting unit 104 periodically monitors the approval number management information stored in the approval number management information storage unit 105, and upon detection of the approval number management information with the work termination date and time exceeding the current date and time, deletes the approval number management information from the approval number management information storage unit 105.

Figure 2:
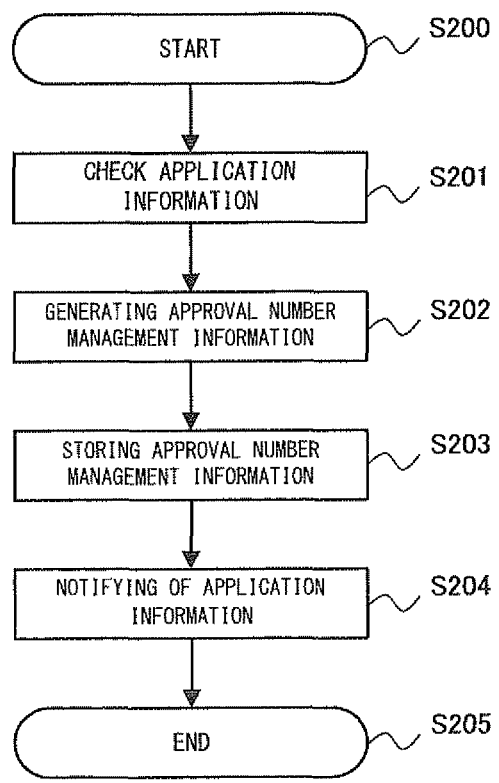
FIG. 2 is a flowchart showing a practical process of the application processing unit according to an embodiment of the present invention.

FIG. 2 is a flowchart showing the practical process of the application processing unit 101 according to the present embodiment.

For example, the operator logs in the work support apparatus 100 from the operator terminal 111 with an operator account, and performs a work application on the work support apparatus 100. At this time, upon receipt of the work application, the work support apparatus 100 starts application processing, and passes control to step S210.

In step S201, when the application processing unit 101 acquires a work condition from the operator terminal 111, it checks the work condition. For example, the present embodiment checks whether or not the work condition includes a privilege necessary for the work, a work starting date and time, a work termination date and time, and an operator account.

In step S202, the application processing unit 101 assigns an approval number to the work application. In the present embodiment, an approval number is generated by combining a current date and time and a serial number sequentially assigned in the order of a work application for uniqueness in the work support apparatus 100. For example, when an application on the current date and time of Jan. 1, 2008 at 10:00 is the first application on the day, the approval number is "20080101_001".

Then, the application processing unit 101 generates approval number management information by combining the approval number and an approval/non-approval flag for identification of the approval/non-approval for the work application with the work condition. FIG. 5 shows an example of the approval number management information.

In step S203, the application processing unit 101 stores the approval number management information generated in step S202 in the approval number management information storage unit 105. Furthermore, in step S204, the application processing unit 101 notifies the administrator terminal 110 of the approval number generated in step S202 and work conditions.

Figure 3:
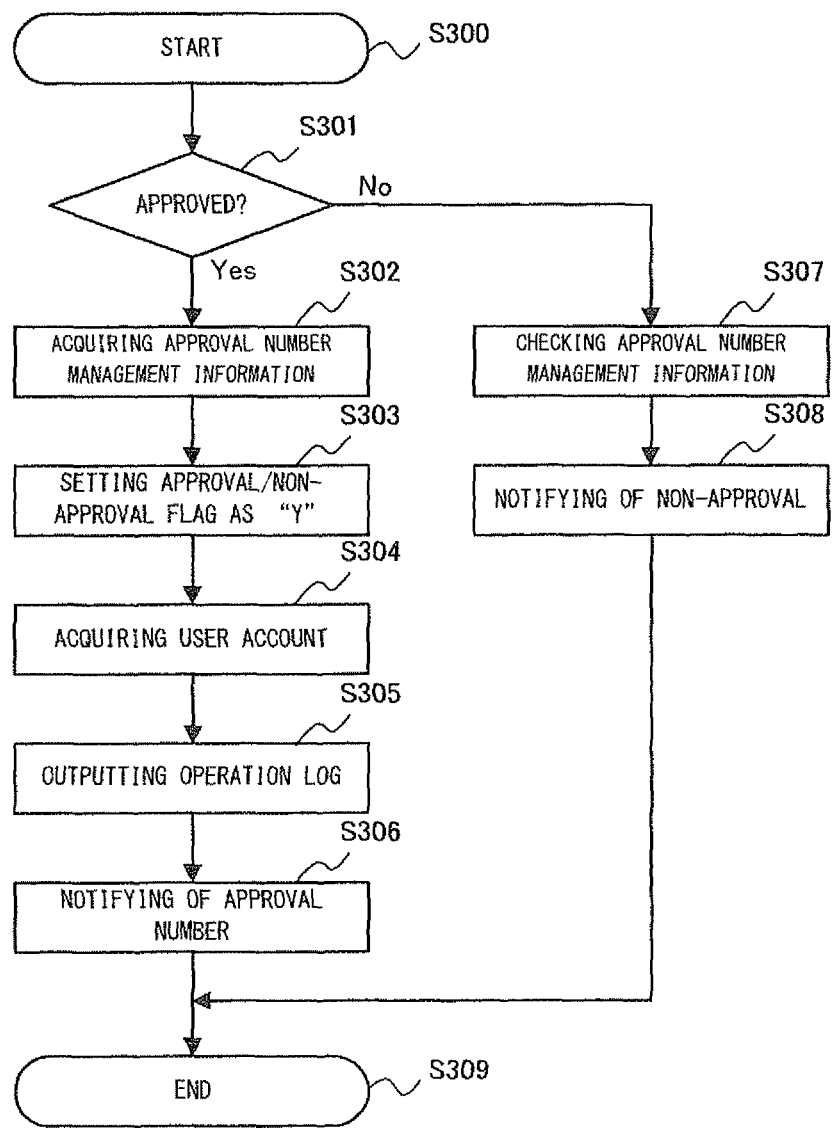
FIG. 3 is a flowchart showing a practical process of the approval processing unit according to an embodiment of the present invention.

FIG. 3 is a flowchart showing a practical process of the approval processing unit 102 according to an embodiment of the present invention.

When approval/non-approval is received (hereinafter referred to as a "approval/non-approval notification") with the approval number from the administrator terminal 110, the work support apparatus 100 passes control to step S301.

In step S301, when the approval processing unit 102 determines that a approval/non-approval notification refers to a notification of the approval of a work application, the approval processing unit 102 passes control to step S302, and acquires from the approval number management information storage unit 105 the approval number management information corresponding to the approval number transmitted with the approval/non-approval notification from the operator terminal 111.

In step S303, the approval processing unit 102 sets the approval/non-approval flag in the approval number management information as "Y". Then, the approval processing unit 102 stores the approval number management information in the approval number management information storage unit 105.

In step S304, the approval processing unit 102 acquires an administrator account relating to the approval/non-approval notification from the administrator terminal 110, and outputs (stores) the approval number, the administrator account, and the work condition as an operation log to the operation log storage unit 106. FIG. 6 shows an example of an operation log b.

In step S306, the approval processing unit 102 notifies the operator terminal 111 (or operator account) of the notification that the work application has been approved together with the approval number.

On the other hand, when the approval/non-approval notification refers to the non-approval of the work application in step S301, the approval processing unit 102 passes control to step S307.

In step S307, the approval processing unit 102 deletes the approval number management information about the approval number from the approval number management information storage unit 105. In step 308, the approval processing unit 102 notifies the operator terminal 111 (or the operator account) of the notification that the work application has been rejected.

Figure 4:
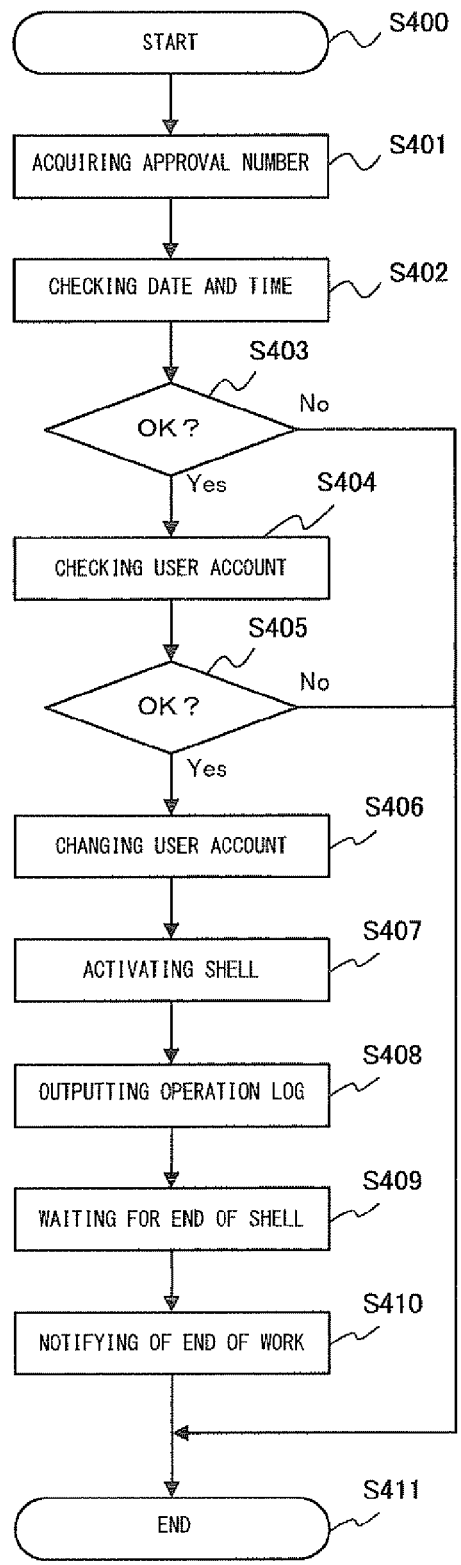
FIG. 4 is a flowchart showing a practical process of the work monitoring unit according to an embodiment of the present invention.

FIG. 4 is a flowchart showing a practical process of the work monitoring unit 103.

For example, an operator logs in with an operator account from the operator terminal 111, and notifies the work support apparatus 100 of the start of the approved work and the corresponding approval number (hereinafter referred to as a "work start notification"). At this time, upon receipt of the work start notification, the work support apparatus 100 passes control to step S401.

In step S401, the work monitoring unit 103 acquires an approval number from the operator terminal 111. The work monitoring unit 103 acquires the approval number management information corresponding to the approval number from the approval number management information storage unit 105.

In step S402, the work monitoring unit 103 acquires the current date and time. Then, it is checked whether or not the date and time falls from the work starting date and time to the work termination date and time recorded in the approval number management information.

If it is determined in step S403 as a result of the check in step S402 that the current date and time falls from the work starting date and time to the work termination date and time recorded in the approval number management information, the work monitoring unit 103 passes control to step S404. In addition, if it is determined that the current date and time does not fall from the work starting date and time to the work termination date and time recorded in the approval number management information, the work monitoring unit 103 passes control to step S411, notifies the operator terminal 111 that the work cannot be approved, and terminates the process.

In step S404, the work monitoring unit 103 compares the operator account as a destination of the work start notification with the user account recorded in the approval number management information.

If the work monitoring unit 103 determines in step S405 that a result of the comparison refers to matching, then control is passed to step S406. If the work monitoring unit 103 determines in step S405 that a result of the comparison refers to non-matching, then control is passed to step S411, notifies the operator terminal 111 that the work cannot be approved, and terminates the process.

In step S406, the work monitoring unit 103 changes the operator account into an account of a privilege recorded in the approval number management information (hereinafter referred to as a "privileged account"), and activates a shell (or a process) with the changed privileged account. At this time, for example, the operating system adds an approval number to the process information about the shell.

Thus, the operator can perform a work with a privileged account. In addition, the work with a privileged account is sequentially detected by the work monitoring unit 103, and outputs an operation log with an approval number held as process information (step S408). FIG. 6 shows an operation logs c and d, and their examples.

In the process in the operating system (for example, the process in a system call), the file manipulation (generation, deletion, read, write, attribute change, file name change, etc.) performed by an operator assigned a privilege with the approval number held in the process information, the process operation (activation, forcible stop, etc.), etc. can be detected, and an operation log is output with the approval number held as the process information.

In step S409, the work monitoring unit 103 enters a wait state for the termination of a shell activated in step S407. When the end of the shell is detected, control is passed to step S410.

In step S410, the work monitoring unit 103 notifies the administrator terminal 110 (or an administrator account) of the termination of the work with the approval number. After returning the privileged account to the original operator account, the work monitoring unit 103 returns control to step S411, and terminates the process.

FIG. 5 shows an example of the approval number management information according to an embodiment of the present invention.

The approval number management information according to the present embodiment includes an approval number, a work starting date and time, a work termination date and time, a user account, a privilege (user account having a privilege), and an approval/non-approval flag.

For example, the approval number management information a shown in FIG. 5 refers to the approval number "20071130_001", the work starting date and time "20071225150000", the work termination date and time "20071225210000", the user account "dbmanager", the privilege "dbadmin", and the approval/non-approval flag "Y".

The approval number "20071130_001" refers to the first work application accepted on Nov. 30, 2007.

The work starting date and time "20071225150000" and the work termination date and time "20071225210000" indicate that the starting date and time of the work to be applied is Dec. 25, 2007 at 15:00:00, and the termination date and time is Dec. 25, 2007 at 21:00:00.

FIG. 6 shows an example of the operation log according to an embodiment of the present invention.

The operation log is output as necessary by the process of each element configuring the work support apparatus 100. Therefore, the operation logs of the operations with various user accounts are stored in the operation log storage unit 106.

The operation log b shows an example of the operation log generated by the approval processing unit 102 and output to the operation log storage unit 106. The operation log is log data including the "approval date and time", the "administrator account" as an approver, the "starting date and time of applying work", the "termination date and time of applying work", the "user account", the applied "privilege (user account having a privilege)", the "approval result", and the "approval number".

The operation log c shows an example of the operation log generated by the work monitoring unit 103 and output to the operation log storage unit 106. The operation log is log data including the "work starting date and time", the "privilege" assigned to an operator account, the "start/end" of a work and the "approval number".

The operation log d refers to an example of an operation log output to the operation log storage unit 106 after the work is detected by the work support apparatus 100 when the work applied from the operator terminal 111 is performed. The operation log is log data including the "work date and time", the "operator account", "target operation (for example, a file name, a process name, etc.)", the "operation (for example, read/write, etc.)", and the "approval number".

FIG. 7 shows an example of an operation log confirmed by an administrator according to an embodiment of the present invention.

Since the operation log according to the present embodiment is assigned an approval number, and when an administrator requests to confirm the situation of the work about a specific work, only the operation log assigned an approval number of the work can be extracted from the operation log storage unit 106.

FIG. 7 shows an example when only the operation log assigned the approval number "20071200_001" is extracted from the log data shown in FIG. 6. Thus, it can be easily confirmed whether or not the application work has been appropriately performed.

An embodiment in which each of the above-mentioned application processing unit 101, approval processing unit 102, work monitoring unit 103 is implemented on the work support apparatus 100 respectively as an "oprequest command", an "opapprove command", and an "opbegin command", and the approval number collecting unit 104 is implemented on the work support apparatus 100 as a "opcleanupd daemon".

(1) On Dec. 20, 2007, if the operator logs in with the operator account "sysmanager" in the period from Jan. 1, 2008 at 12:00:00 (work starting date and time) to Jan. 1, 2008 at 18:00:00 (work termination date and time), and performs a work of patch application using a root authority, the operator applies for a work using the following oprequest command.

>oprequest -s 20080101120000-e 20080101180000-p root -u sysmanager

Upon detection of the issue of the command, the application processing unit 101 performs the process shown in FIG. 2. Then, it notifies the administrator terminal 110 (administrator account) of the approval number "20071220_001" generated by assigning a serial number to the date and time of a work application with the above-mentioned work condition through e-mail etc.

(2) The administrator performs approval or rejection using the opapprove command as described below from the administrator terminal 110

>opapprove -n 20071220_001-r APPROVE

The above-mentioned option "-r" is an option specifying approval or rejection, and "APPROVE" indicates approval.

Upon detection of the issue of the command, the approval processing unit 102 performs the process shown in FIG. 3. If approval is granted, a desired work in an applied period can be performed. The approval/non-approval is reported to the operator terminal 111 (operator account) by e-mail etc.

(3) When the applied work starting date and time Jan. 1, 2008 at 12:00:00 is reached, the operator logs in from the operator terminal 111 with the operator account "sysmanager", and starts the work using the opbegin command as follows.

>opbegin -n 20071220_001

Upon receipt of the issue of the command, the work monitoring unit 103 performs the process shown in FIG. 4. For example, it checks whether or not the approval/non-approval flag recorded in the approval number management information corresponding to the approval number "20071220_001" is set as "Y", checks whether or not the date and time of the issue of the command falls in the period from the work starting date and time to the work termination date and time recorded in the approval number management information corresponding to the approval number "20071220_001", and checks whether or not the user account with which the command is issued matches the user account recorded in the approval number management information corresponding to the approval number "20071220_001".

If it is determined that all conditions are satisfied, the work monitoring unit 103 switches the account "sysmanager" to the privilege "root" record in the approval number management information, and activates a new shell.

(4) The operator performs patch applying work with the root privilege. At this time, the manipulation of files, processes, etc. are temporarily stored as an work log assigned an approval number in the operation log storage unit 106.

(5) Upon detection that the operator terminates a shell, the work monitoring unit 103 notifies by e-mail etc. the administrator terminal 110 (administrator account) of the approval number "20071220_001" and that the work corresponding to the approval number has been completed.

(6) The administrator logs in the work support apparatus 100 and extracts the operation log relating to the approval number "20071220_001" using the opview command as described below to confirm whether or not the work has been appropriately performed.

>opview -n 20071220_001

Upon detection of the issue of the command, the work support apparatus 100 refers to the operation log storage unit 106 and extracts only the operation log assigned a specified approval number. For example, it displays the log on a display device etc. in a time series.

(7) The opcleanupd daemon as a resident program refers to the approval number management information recorded on the approval number management information storage unit 105 in each predetermined period, and deletes the approval number management information when the approval number management information exceeding the work termination date and time is detected.

As described above, when the administrator terminal 110 approves the desired work applied in advance, the work support apparatus 100 according to the present embodiment stores the approval number management information in the approval number management information storage unit 105. When the operator terminal 111 requests starting the work approved in advance, the work monitoring unit 103 checks whether or not the work conditions etc. recorded in the approval number management information are satisfied, and a desired privilege is assigned only when the conditions are satisfied to perform the work.

Therefore, it is possible to place restrictions so that work requiring a privilege can be performed only when an administrator approves the work. It is also possible to perform work without notification of a password required for a privilege during the work. In addition, since special settings are not required after performing work, it is possible to avoid forgetting necessary work for maintaining a security level after completion of work.

As a result, an operator can be allowed to safely and easily perform work requiring all or a part of a privilege.

In addition, the approval processing unit 102 and the work monitoring unit 103 output an operation log for each approval number, and store the log in the operation log storage unit 106. As a result, since an operation log assigned a specific approval number can be easily extracted, it is possible to easily verify later, for example, whether or not the work of any approval number has been appropriately performed. The work support apparatus stores the approval number management information including the approval number and the work condition for the application in a approval number management information storage unit, and assigns a privilege to an operator terminal only when an application is approved for an administrator terminal and the work condition is satisfied.

As a result, any operator terminal can be allowed to safely and easily perform a work requiring all or a part of the privilege.

In addition, a work monitoring unit assigns a privilege to an operator terminal, stores an operation log including at least an approval number to an operation log storage unit, and nullifies the privilege assigned to the operator terminal when an end of the work performed by the operator terminal and stores the operation log including at least the approval number in the operation log, and the operation log generation unit generates the operation log including at least the approval number for the work when the work of the operator terminal assigned the privilege is detected, and stores the operation log in an operation log storage unit.

As a result, an operation log can be easily extracted from the operation log storage unit relating to the work of a specific approval number, thereby concisely confirming later as to whether or not the work contents have been appropriately performed.

As described above, the work support apparatus can allow an operator to safely and easily perform a work requiring all or a part of a privilege, thereby concisely confirming the work contents later.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A work support apparatus which supports work requiring a specific authority, the work support apparatus comprising:

an application processor to notify an administrator terminal used by an administrator who determines approval/non-approval of an application upon receipt of a work condition including a privilege required to perform specific work from any operator terminal and the application for an approval to perform the work, and to store approval number management information including an approval number for the application and the work condition in an approval number management information storage unit;

an approval processor to store an operation log including at least the approval number included in the approval number management information about the application in response to the approval notification upon receipt of the approval notification of the application from the administrator terminal in an operation log storage unit, and to notify the operator terminal of a result of the approval notification;

a work monitor to read the approval number management information about the application from the approval number management information storage unit upon receipt of a notification of a start of the applied work from the operator terminal, to determine whether the application is approved and a work condition included in the approval number management information is satisfied, to assign the privilege to the operator terminal when it is determined that the application is approved and the work condition is satisfied, and to store in the operation log storage unit an operation log including at least the approval number, and to nullify the privilege assigned to the operator terminal when an end of the work is detected, and to store an operation log including the approval number and operations by the operator terminal in relation to the approval number in the operation log storage unit; and an operation log generator to generate an operation log including at least the approval number for the work when a work of the operator terminal assigned the privilege is detected, and to store the operation log in the operation log storage unit.

2. The apparatus according to claim 1, further comprising an approval number collector to monitor approval number management information stored in the approval number management information storage unit, and to delete approval number management information exceeding a predetermined period from the approval number management information storage unit.

3. The apparatus according to claim 1, wherein the work condition contains a necessary privilege for the work, a date and time of starting work, a date and time of termination of work, and an operator account assigned to the operator terminal.

4. A work supporting method for supporting work requiring a specific authority, the work supporting method comprising:
notifying, by a processor, an administrator terminal used by an administrator who determines approval/non-approval of an application upon receipt of a work condition including a privilege required to perform specific work from any operator terminal and the application for an approval to perform the work, and storing approval number management information including an approval number for the application and the work condition in an approval number management information storage unit;
storing, by the processor, an operation log including at least the approval number included in the approval number management information about the application in response to the approval notification upon receipt of the approval notification of the application from the administrator terminal in an operation log storage unit, and notifying the operator terminal of a result of the approval notification;
reading, by the processor, the approval number management information about the application from the approval number management information storage unit upon receipt of a notification of a start of the applied work from the operator terminal, determining whether the application is approved and a work condition included in the approval number management information is satisfied, assigning the privilege to the operator terminal when it is determined that the application is approved and the work condition is satisfied, and storing in the operation log storage unit an operation log including at least the approval number;
generating, by the processor, an operation log including at least the approval number for the work when a work of the operator terminal assigned the privilege is detected, and storing the operation log in the operation log storage unit; and
nullifying, by the processor, the privilege assigned to the operator terminal when an end of the work is detected, and storing an operation log including the approval number and operations by the operator terminal in relation to the approval number in the operation log storage unit.

5. A computer-readable non-transitory medium storing a program that causes an information processing device to execute a procedure to support work requiring a specific authority, the procedure comprising:
notifying an administrator terminal used by an administrator who determines approval/non-approval of an application upon receipt of a work condition including a privilege required to perform specific work from any operator terminal and the application for an approval to perform the work, and storing approval number management information including an approval number for the application and the work condition in an approval number management information storage unit;
storing an operation log including at least the approval number included in the approval number management information about the application in response to the approval notification upon receipt of the approval notification of the application from the administrator terminal in an operation log storage unit, and notifying the operator terminal of a result of the approval notification;
reading the approval number management information about the application from the approval number management information storage unit upon receipt of a notification of a start of the applied work from the operator terminal, determining whether the application is approved and a work condition included in the approval number management information is satisfied, assigning the privilege to the operator terminal when it is determined that the application is approved and the work condition is satisfied, and storing in the operation log storage unit an operation log including at least the approval number;
a generating an operation log including at least the approval number for the work when a work of the operator terminal assigned the privilege is detected, and storing the operation log in the operation log storage unit; and
nullifying the privilege assigned to the operator terminal when an end of the work is detected, and storing an operation log including the approval number and operations by the operator terminal in relation to the approval number in the operation log storage unit.

6. The computer-readable non-transitory medium according to claim 5, further comprising
storing instructions to monitor approval number management information stored in the approval number management information storage unit, and to delete approval number management information exceeding a predetermined period from the approval number management information storage unit.

7. The computer-readable non-transitory medium according to claim 5, wherein
the work condition contains a necessary privilege for the work, a date and time of starting work, a date and time of termination of work, and an operator account assigned to the operator terminal.

8. The method according to claim 4, further comprising
monitoring approval number management information stored in the approval number management information storage unit, and deleting approval number management information exceeding a predetermined period from the approval number management information storage unit.

9. The method according to claim 4, wherein
the work condition contains a necessary privilege for the work, a date and time of starting work, a date and time of termination of work, and an operator account assigned to the operator terminal.

10. The apparatus according to claim 3, wherein
the operation log generator is to store log data including a work data, a work time, an operator account, a target operation, an operation and an approval number.

* * * * *